FIG_2

FIG_1

FIG_3

FIG_6

FIG_5

FIG_4

FIG_7

FIG_17

FIG_18

FIG_19

FIG_20

Nov. 10, 1970  D. H. VAN TUYL  3,538,662
ROOM STRUCTURE
Filed March 17, 1969  10 Sheets-Sheet 9

FIG_21  FIG_22

FIG_23  FIG_24

INVENTOR.
DAVID H. Van TUYL
BY
ATTORNEYS

Nov. 10, 1970     D. H. VAN TUYL     3,538,662
ROOM STRUCTURE Filed March 17, 1969     10 Sheets-Sheet 10

INVENTOR.
DAVID H. Van TUYL
BY
Mellin, Moore + Weissenberger
ATTORNEYS

United States Patent Office 3,538,662
Patented Nov. 10, 1970

3,538,662
ROOM STRUCTURE
David H. van Tuyl, Palo Alto, Calif., assignor to Clemco-Clementina Ltd., San Francisco, Calif., a general partnership
Filed Mar. 17, 1969, Ser. No. 807,828
Int. Cl. E04b 1/343, 2/62; E04h 5/02
U.S. Cl. 52—262
12 Claims

ABSTRACT OF THE DISCLOSURE

Disclosed herein is a room structure having a floor framework, a roof framework, and upright beams interconnecting these frameworks. A number of wall plates, each overlapping adjacent upright beams, a portion of the floor framework, and a portion of the roof framework, form a wall. Strip means are associated with the upright beams and roof framework and, through clamp means, act to force the panels thereagainst. The location of the clamp means is determined only by one fabricated part.

BACKGROUND OF THE INVENTION

This invention relates to a prefabricated room structure particularly suited to sandblasting or the like and, more particularly, to such a room which lends itself to quite easy assembly and disassembly.

Construction of a sandblasting room or the like may, of course, take a variety of forms. For example, the room may have a frame of wood with metal plates or sheet fixed thereto, or there may be more extensive use of metal with a great deal of welding. In either case, there must either be a great deal of prefabrication of parts before shipping, or a great deal of fabrication must take place at the actual site of the room. Furthermore, once the room is constructed, it can only be disassembled with great difficulty. Thus the room must of necessity become a relatively permanent structure.

It would obviously be desirable to provide a room structure which includes a minimum of prefabricated, non-standard parts, with the balance to be made up of standard parts which can be ordered cut to desired size. In this way, the expense of intricate prefabrication is avoided, and the shipping cost of parts is kept to a minimum, it being a quite simple matter to order standard parts from a local distributor, such as plates and channels, cut to desired dimensions, to avoid having them shipped. This cuts down to a great extent on any possible error in erection and, because of such standard parts, cuts down on the overall cost. Furthermore, because a majority of the parts are standard, less damage during shipping of the necessarily prefabricated parts, due to more efficient packing, can be realized.

It is an object of this invention to provide a room structure which is made up of a minimum of prefabricated parts, and the balance of inexpensive, standard parts which may be easily cut to size and shipped.

It is a further object of this invention to provide a room structure which, while fulfilling the above object, is extremely effective in its function as a sandblasting room.

SUMMARY OF THE INVENTION

Broadly stated, applicant's room structure comprises a room framework comprising a floor framework having a rectangular periphery. Included is a roof framework disposed above the floor framework and having a rectangular periphery. A plurality of upright beams extend from the periphery of the floor framework to the periphery of the roof framework in spaced relation to each other, each pair of adjacent upright beams forming with the portion of the floor framework and the portion of the roof framework running therebetween a framework opening. A floor is associated with the floor framework. Further included is a wall comprising a plurality of wall plates, each adapted to overlap to a small extent a pair of adjacent upright beams and to overlap the floor framework and roof framework portions running therebetween to close the framework opening formed thereby, the edges of adjacent wall plates overlapping the same upright beam being spaced from each other. Each of said upright beams provides a continuous gap for attachment of the wall plates. Included are a plurality of strip means, each associated with an upright beam and overlapping the edges of the adjacent wall plates which overlap the same upright beam. Means are included for fixing each strip means to its associated upright beam so that that strip means bears against the wall plate edges overlapped by the strip means and holds the wall plates in place. A roof is associated with the roof framework.

BRIEF DESCRIPTION OF THE DRAWINGS

These and other objects of the invention will become apparent from a study of the following description and drawings, in which:

FIG. 2 is a section taken along the line 2—2 of FIG. 1 without wall plates, etc. in place;
FIG. 7 is a view similar to that of FIG. 3, but with the wall in place;
FIGS. 21–24 are a series of perspective views of the room structure showing the steps of construction thereof.

DESCRIPTION OF THE PREFERRED EMBODIMENT

Figure 1:
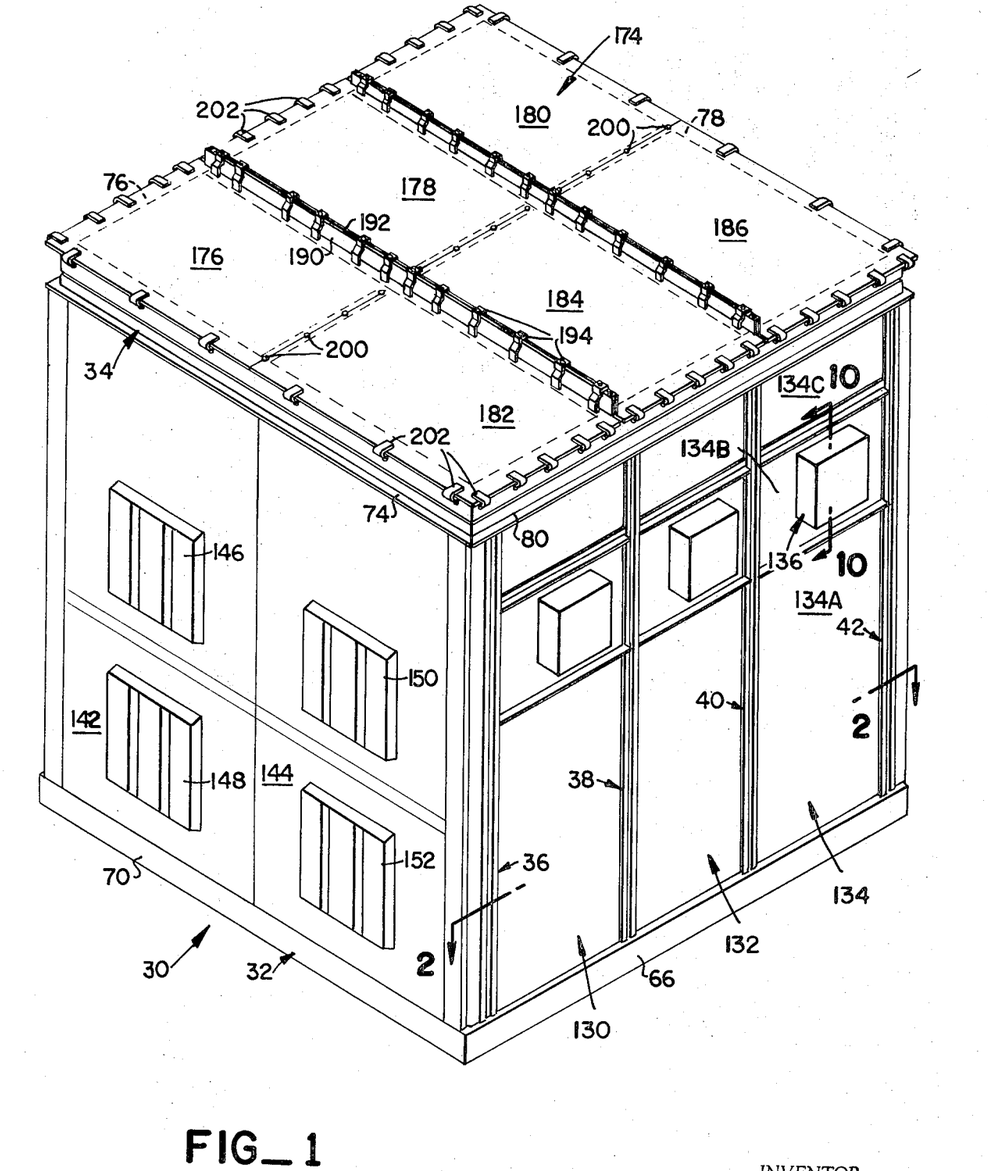
FIG. 1 is a perspective view of the sandblasting room.

The room structure disclosed herein is shown generally at 30 in FIG. 1. The room structure 30, as shown therein, includes a floor framework 32, a roof framework 34 disposed above the floor framework 32, and upright beams 36, 38, 40, 42, 44, 46, 48, 50, 52, 54, 56, 58 (FIG. 2) extending between the floor framework 32 and roof framework 34. The roof and floor frameworks 34, 32 are substantially rectangular, and form with the upright beams 36–58 a framework 35 (FIG. 22). The floor framework 32 (FIG. 21) is made up of parallel rails 60, 62, 64, 66 and rails 68, 70 joining them at their ends. Fixed to rail 68 and disposed parallel to it is a rail 72. Between rail 72 and rail 68 may be housed the drive mechanism of a conveyor-type sand recovery system which may have its conveyors disposed between rails 60–62, 62–64, 64–66 to receive sand which faills through a grating resting on framework 32 and acting as a floor (not shown). Such a sand recovery system is disclosed in my copending application entitled "Conveyor," Ser. No. 760,254, filed Sept. 17, 1968.

The roof framework 34 is made up of four rails 74, 76, 78, 80 (FIG. 22). The upright beams 36–58 extend from the periphery of the floor framework 32 to the periphery of the roof framework 34, and their construction will now be described in detail, with particular reference to FIGS. 3–6.

Figure 6:
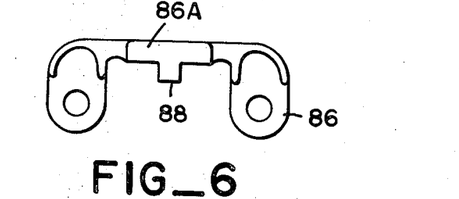
FIG. 6 is a plan view of the casting of FIG. 5.

Taking beam 48 as a typical example, it will be seen that it is made up of a pair of upright adjacent but spaced longitudinal beam members 82, 84. A casting 86, the shape of which is best shown in FIG. 6, is bolted to floor framework rail 68. The casting 86 provides space for the bottoam ends of the beam members 82, 84, and also includes a spacer 88 for maintaining spacing 89 of the beam members 82, 84 at their bottom ends. A clamp 90 is disposed about beam members 82, 84 to force them toward each other and against spacer 88. The clamp 90 has a bolt 92 tapped therethrough which bears against the upright portion 86A of casting 86 to provide such forcing. The tops of the beam members 82, 84 are fixed to the rail 78 by similar structure, disposed, of course, upside down. Space 89 is thus continuous from top to bottom. The other beams 36–46 and 50–58 are fixed to the floor framework 32 and roof framework 34 by similar means. Thus a beam member may be field-assembled from mill sections with no welding or fitting other than cutting to length.

Figure 3:
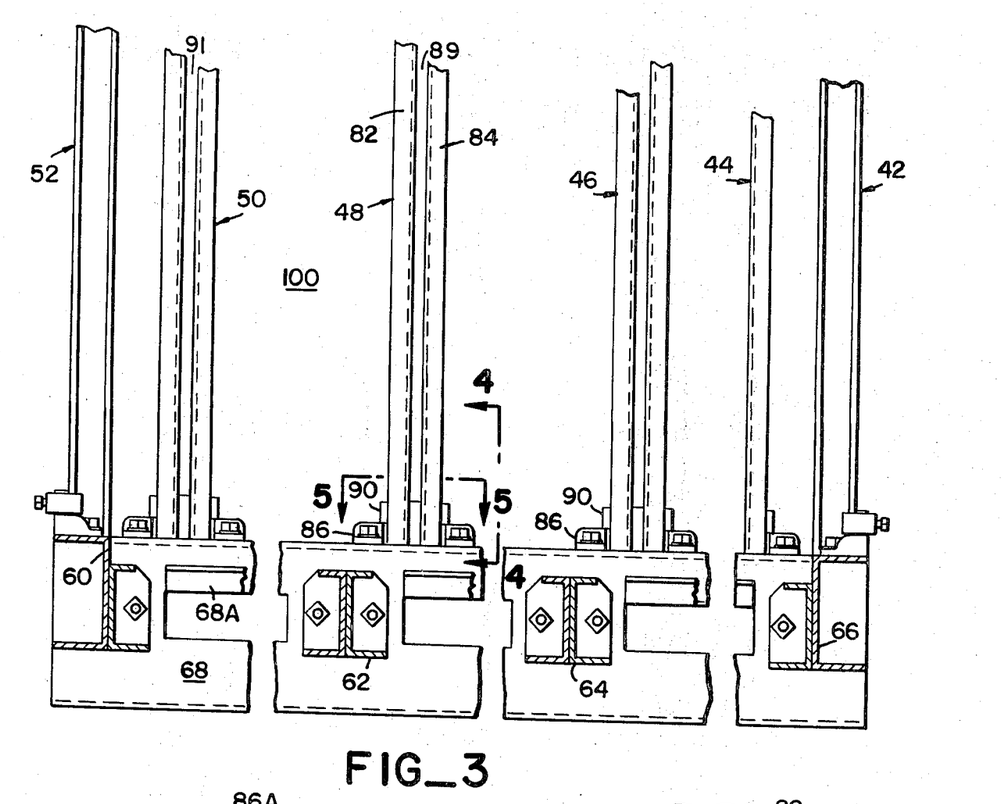
FIG. 3 is a sectional view, with portions removed, taken along the line 3—3 of FIG. 2, with the wall not in place.
Figure 4:
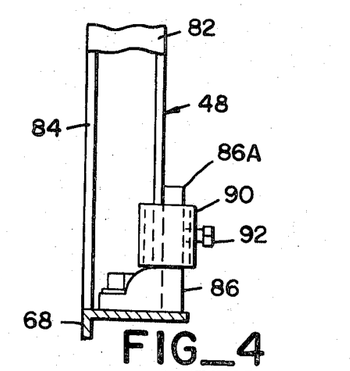
FIG. 4 is a view taken along the line 4—4 of FIG. 3.
Figure 5:
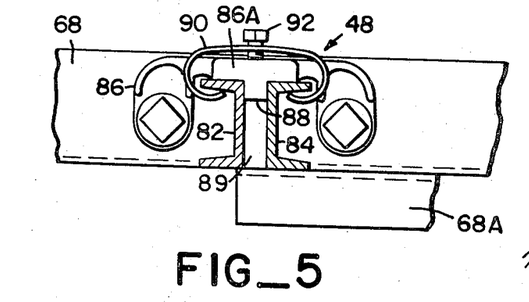
FIG. 5 is a view taken along the line 5—5 of FIG. 3.

It will be understood that adjacent upright beams, as beams 48, 50, form with the portions of floor framework 32 and roof framework 34 a plurality of openings in framework 35, as at 100 (FIGS. 3 and 7). A wall plate 102 (FIG. 7) is configured to fit over the opening 100 and overlap to a small extent upright beams 48 and 50, but not the slot 89, or the slot 91 in beam 50 and overlap to a small extent the floor framework and roof framework portions running between the upright beams 48, 50. The opening 100 is thus closed by the wall plate 102. Similar plates, as at 104, 106 are configured to close other openings in the framework. At the corners of the structure 30 (FIG. 8), angled wall plates as at 108 are provided to fill the openings therein defined by the framework 35 (FIG. 22).

Figures 8, 9, 10:
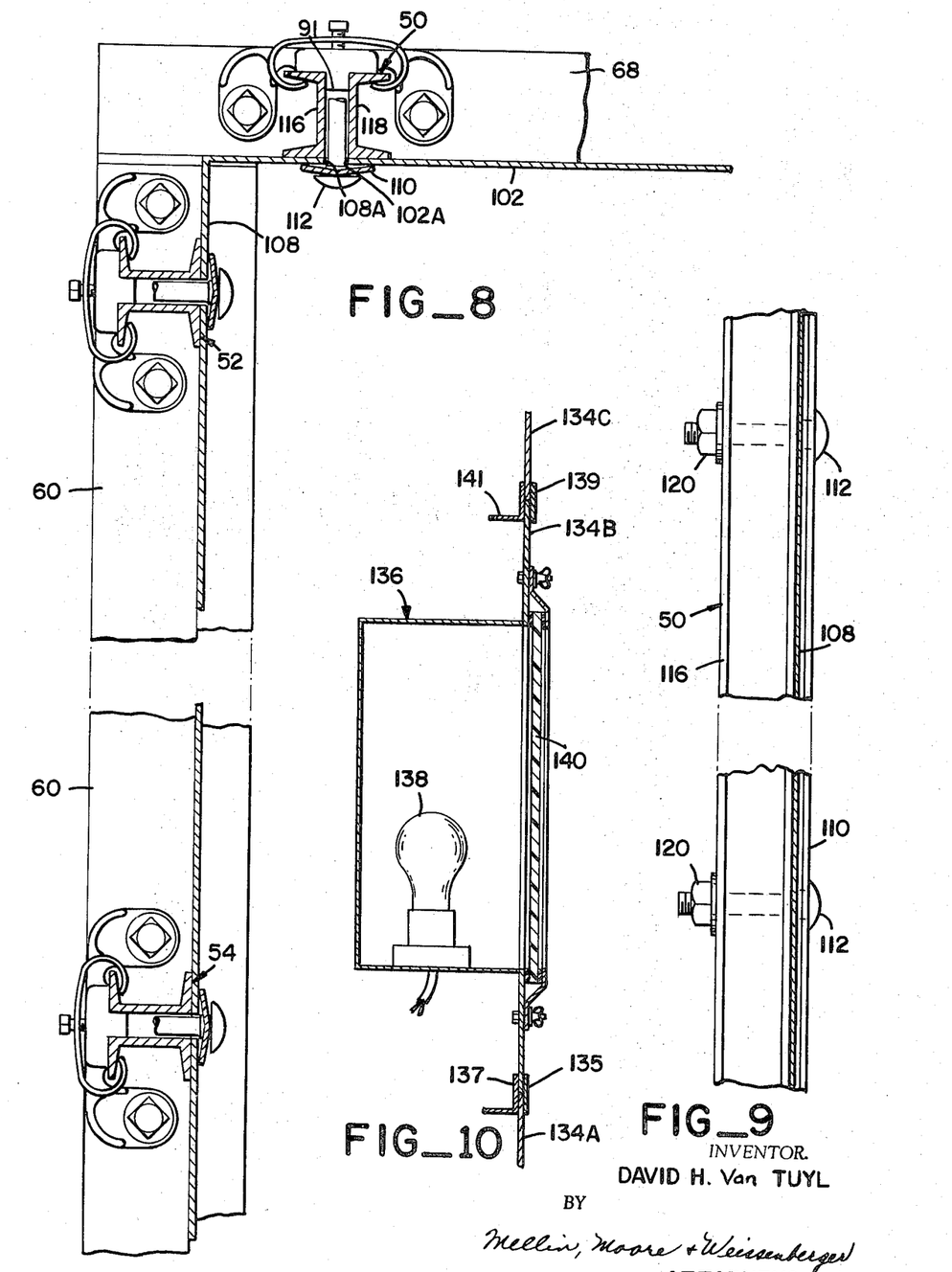
FIG. 8 is an sectional view taken along the line 8—8 of FIG. 7.
FIG. 9 is a view taken along the line 9—9 of FIG. 7.
FIG. 10 is a view taken along the line 10—10 of FIG. 1.

FIGS. 7 and 8 reveal that adjacent wall plates 102, 108 overlap a single upright beam 50, with the adjacent edges thereof 102A, 108A being spaced a distance apart. A strip 110 is fitted over the adjacent edges 102A, 108A of wall plates 102, 108, and carriage bolts 112 are disposed through square apertures 114 in the strip 110, and through and from the spacing 91 between the beam member 116, 118 of upright beam 50. Nuts 120 (FIG. 9) are fitted to the ends of the bolts 112, and, as they are tightened, the strip 110 bears against the edges 102A, 108A to hold them against the upright beam 50. It is obvious therefore that spacing of bolts 112 is determined only by strip means 110 and requires no matching holes in plates 102, 108 for assembly.

Such square apertures 114 act to hold the carriage bolts 112 disposed therein from turning, so that only the nuts 120 need be tightened, it being insured that the carriage bolts will be held properly.

It should be noted that the cross section of strip 110 is angled so that the edges thereof place continuous pressure against edges 102A, 108A, to hold them against beam members 116, 118. The strip 110 also insures that there are no gaps between these beam members 116, 118 or edges 102A, 108A.

Each of the other upright beams 36–48 and 52–58 has a similar strip associated with it.

As shown in FIG. 7, a strip 122 overlaps the upper edge 102B of wall plate 102 and a portion of rail 78 of the roof framework 34 thereadjacent. Carriage bolts 124 are disposed through square apertures 126 therein, and through continuous slot 128 in upper frame 34, defined between rail portions 78A, 78B of rail 78. Nuts are fitted to the bolts 124 and, as they are tightened, the strip 122, similar in cross section to strip 110, bears against the upper edge 102B of the plate 102 and the upper frame 34, holding the upper edge 102B in place. Similar to strip 110, spacing of bolts 124 is determined only by strip 122. The bottom edge 102C of the plate 102 rests on an inwardly extending portion 68A of rail 68, which supports the plate 102 in such position. In such manner walls are provided.

It will be understood that mastic sealing may be provided between the wall plates and the upright beams, floor and roof framework to effect a proper seal therebetween.

Certain wall plates, as 130, 132, 134 (FIG. 1) are provided with structure for illuminating the room 30, as shown in FIG. 10. Wall plate 134, which is typical of the construction, is made up of a bottom plate portion 134A, an intermediate plate portion 134B, and a top plate portion 134C, which are interconnected as shown in FIG. 10. Intermediate plate portion 134B has welded along its bottom edge brace member 135 and angle member 137. The top edge of bottom plate portion 134A is positioned between the brace member 135 and angle member 137, and the bottom edge of intermediate plate portion 134B rests on the top edge of bottom plate portion 134A. The intermediate plate portion 134B has welded along its top edge brace member 139 and angle member 141. The bottom edge of the top plate portion 134C rests on the top edge of intermediate plate portion 134B between brace member 139 and angle member 141. The illuminating structure includes a box 136 in which is disposed an electric light bulb 138 connected to a power source (not shown). The box 136 has an open side which registers with an aperture in intermediate plate portion 134B, and a translucent panel 140 is fixed to the intermediate plate portion 134B over the aperture. When light bulb 138 is illuminated, light is provided to the inside of the room structure 30. It should be noted that the light in the room structure 30 is thus provided from the wall thereof. This results in good room lighting for operation.

It should be noted that, by such design of the wall panel 134 and other wall panels which provide illumination means, only intermediate plate portion 134B and its associated structure (angle members 137, 141, brace members 135, 139, box 136, light bulb 138, and translucent panel 140) need be prefabricated. The top plate portion 134C and bottom plate portion 134A are standard metal sheets which may easily be ordered cut to specification by the person erecting the room.

Figures 11, 12, 13, 14, 14A:
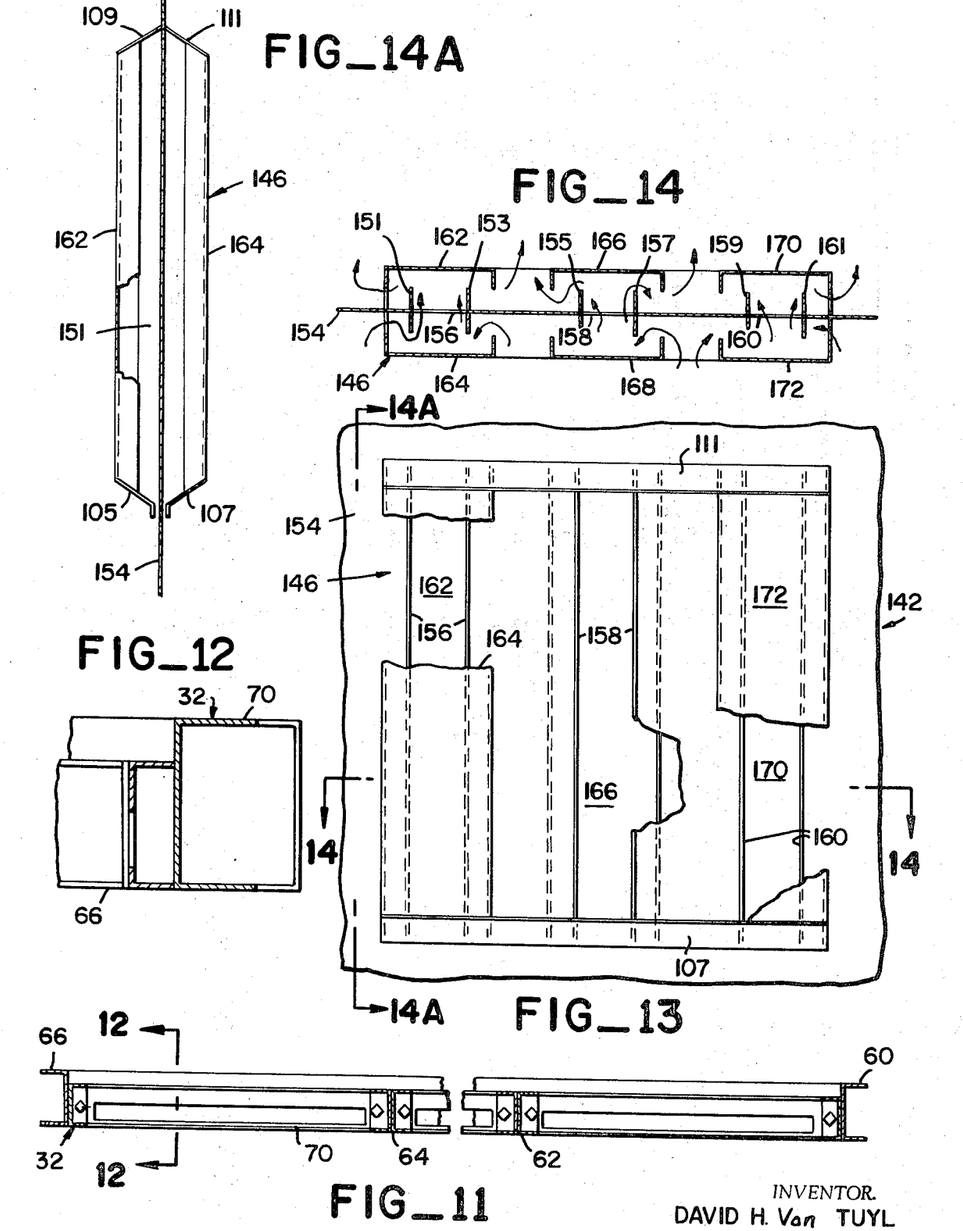
FIG. 11 is a sectional view taken along the line 11—11 of FIG. 2.
FIG. 12 is a sectional view taken along the line 12—12 of FIG. 11.
FIG. 13 is an enlarged side elevation of a portion of the door of the structure, with portions broken away.
FIG. 14 is a sectional view taken along the line 14—14 of FIG. 13.
FIG. 14A is a view taken along the line 14A—14A of FIG. 13.
Figure 15:
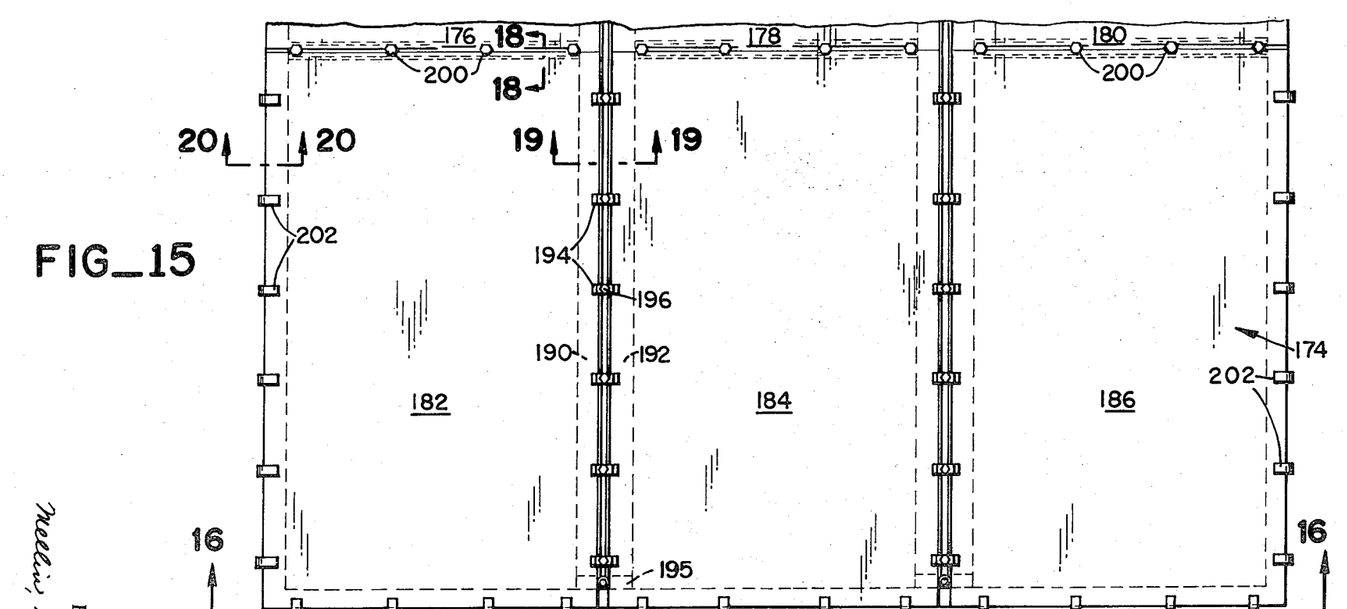
FIG. 15 is a plan view, with portions removed, of the rof of the structure.
Figure 16:
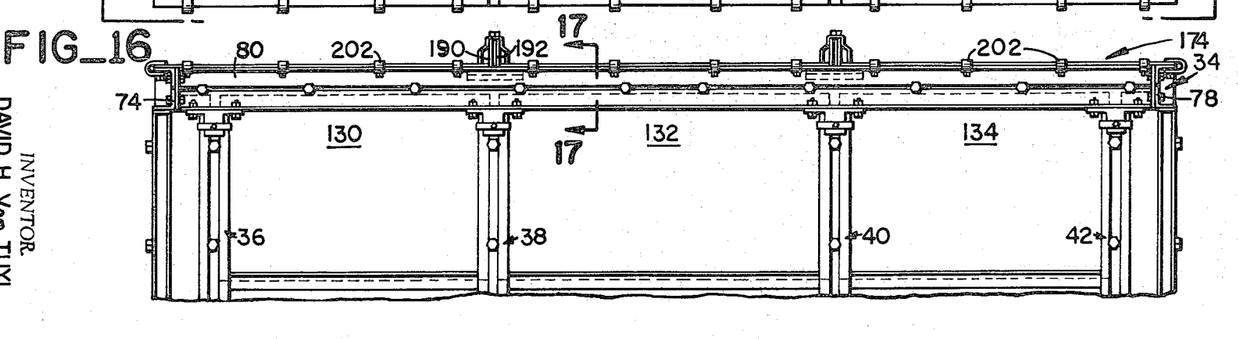
FIG. 16 is a view taken along the line 16—16 of FIG. 15.

Door columns 101, 103 (FIG. 2) run between the floor framework 32 and roof framework 34, and pivotally fitted to these door columns 101, 103 are doors 142, 144 respectively, which are adapted to close the open end defined by the structure 30. These doors 142, 144 include door structures 146, 148, 150, 152 (FIG. 1)

which allow passage of air therethrough. One of such structures, 146, is shown in detail in FIGS. 13–14A. As shown therein, door plate 154 has a series of cross plates 151, 153, 155, 157, 159, 161 which define apertures 156, 158, 160. Fixed along the bottoms of apertures 156, 158, 160 on either side of plate 154 are brackets 105, 107. Fixed along the tops of apertures 156, 158, 160 on either side of plate 154 are brackets 109, 111. Fixed to brackets 107, 111 is baffle 162, and fixed to brackets 105, 109 is baffle 164. These baffles 162, 164 are spaced from plate 154 on either side of aperture 156 and over the ends of cross plates 151, 153. Baffles 166, 168 are in similar spaced relationship with cross plates 155, 157 and aperture 158, and baffles 170, 172 are in similar spaced relationship with cross plates 159, 161 and aperture 160. Each of these baffles 162–172 overlaps the aperture associated therewith to an extent. As indicated by the arrows in FIG. 14, air can flow freely through the structure 146 of door 142. However, because of the overlapping relationship of the baffles 162–172 with the apertures 156–160 and the cross plates 151, 153, 155, 157, 159, 161, sand granules, flying in a relatively straight line toward the door 142, will not gain access to any of the apertures 156–160, but will strike a baffle 164, 168, 172, cross plates 151, 153, 155, 157, 159 or 161, or the plate 154 itself and remain in the confines of the room structure 30. Bracket 105 is spaced from plate 154 (FIG. 14A) to define a gap through which the granules fall back into the room. The doors 142, 144 may, of course, be opened to their full extent to allow workmen and equipment to enter and leave the room structure 30.

Associated with the roof framework 34 is a roof 174, the structure of which is best shown in FIGS. 15–20. Roof structure 174 includes substantially coplanar roof plates 176, 178, 180, 182, 184, 186. The adjacent edges of roof plates 182, 184 are joined by means best shown in FIG. 19. These adjacent edges are disposed on portions 190A, 192A of spaced longitudinal angles 190, 192, which together form an angle structure 193. A brace strip 188 is disposed under these angles 190, 192 to close the gap therebetween. Generally U-shaped clamping members 194 are disposed over and along the upper portions of angles 190, 192. These clamping members contact the upper portions of angles 190, 192 at 190B and 192B, and are adapted to clamp down on the adjacent edges of the roof plate 182, 184 and hold them between the clamping members 194 and portions 190A, 192A of angles 190, 192 by means of nut-and-bolt structures 196 which pass through openings in brace strip 188 and between the angles 190, 192. The contacting between the clamping members and angles 190, 192 at 190B, 192B limits the outward movement at 190B, 192B under the pressure of the clamping members. It will be understood that the adjacent edges of roof plates 184, 186, roof plates 176, 178, and roof plates 178, 180 are joined in the same manner.

Figures 18, 19:
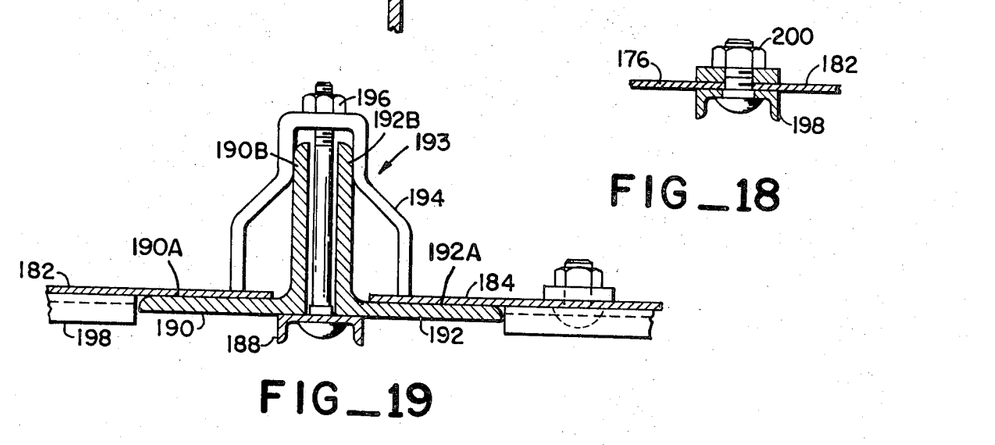
FIG. 18 is a sectional view taken along the line 18—18 of FIG. 15.
FIG. 19 is a sectional view taken along the line 19—19 of FIG. 15.

The adjacent edges of roof plates 176, 182 are joined by means best shown in FIG. 18. Running along and under these adjacent edges is a brace strip 198. The adjacent edges of roof plates 176, 182 overlap the brace strip 198 to an extent, and are held thereagainst by a plurality of nuts and bolts 200. It will be understood that the adjacent edges of roof plates 178, 184 and 180, 186 are joined in the same manner as the adjacent edges of 176, 182. It will be understood that spacing of the bolts in the roof structure 174 is determined only by the brace strips utilized.

Figure 17:
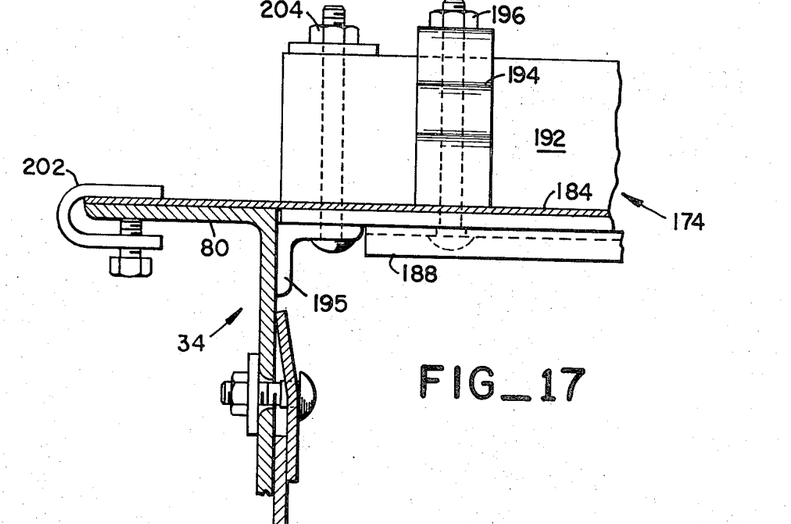
FIG. 17 is a sectional view taken along the line 17—17 of FIG. 16.
Figure 20:
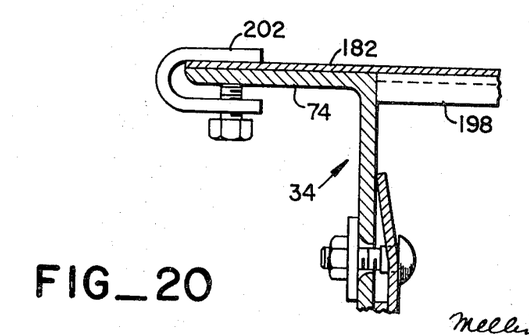
FIG. 20 is a sectional view taken along the line 20—20 of FIG. 15.

The outer periphery of the roof structure 174 is fixed to the roof framework 34 by means best shown in FIGS. 17 and 20. As shown therein, a plurality of C-clamps 202 are used to push the outer periphery of the roof structure 174 against the rail members (as 80) of the roof framework 34. In addition, fasteners, as 204, are used at the ends of angle members (as 190, 192) to fasten them to angle bars, as 195 (FIG. 17) fixed to the roof framework 34. In this fashion the entire roof structure 174 is properly secured to the roof framework 34. It should be noted that, because of angles such as 190, 192, the roof structure is well braced and extremely strong.

FIGS. 21–24 shows the simplicity with which the room structure 30 may be erected. First, the rails 60–72 are constructed to form floor framework 32 (FIG. 21). At this point, a sand recovery system (not shown) may be built in and associated with the floor framework 32. The upright beams 36–58 are then erected (FIG. 22), being fixed to the floor framework 32 by the means previously described. The roof framework 34, made up of rails 74–80, is then fixed to the tops of beams 36–58 (FIG. 22).

FIG. 23 shows some of the wall structure in place. The wall panels, as previously described, are placed to close the framework openings formed by the upright beams 36–58 and the floor and roof framework 32, 34, and are fixed in place by the strip means shown in FIGS. 7 and 8, which are bolted to the upright beams associated therewith, as previously described. The remainder of the walls may then be installed, along with the roof structure 174.

The doors 142, 144 are then installed on the open end of the room structure 30. The room structure may, of course, be disassembled in the reverse order of the assembly just described.

Figure 25:
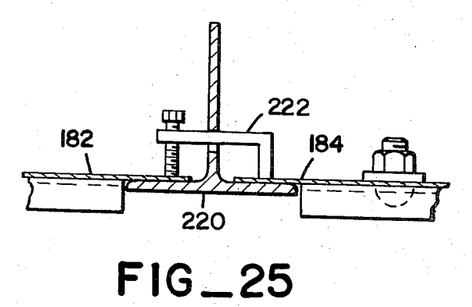
FIG. 25 is a sectional view similar to FIG. 19 showing another embodiment of the roof structure.

In FIG. 25, the angle members 190, 192, brace strip 188, clamping member 194, and fastener structure 196 of FIG. 19 have been replaced by a T-beam 220 and dog 222 which tightens to hold the ends of roof plates 182, 184 against the base portion of T-beam 220. It will be understood that a plurality of dogs 222 are included along the length of T-beam 220 to ensure proper holding of the roof plates 182, 184.

Figure 26:
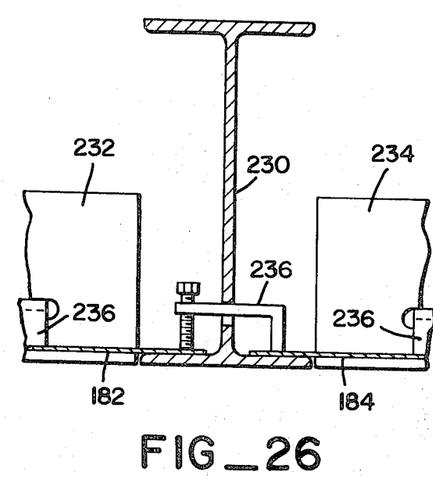
FIG. 26 is a sectional view similar to FIG. 19 showing yet another embodiment of the roof structure.

In FIG. 26, yet another embodiment of roof structure is shown, made up of a plurality of H-beams, as 230, and T-beams, as 232, 234. In this embodiment, dogs 236, along the length of T-beams 232, 234 and H-beams 230, act to fasten roof plates 182, 184 down in proper fashion. The H-beam 230 provides tremendous roof strength so that, if desired, a crane or the like can be supported by the roof structure.

Figure 27:
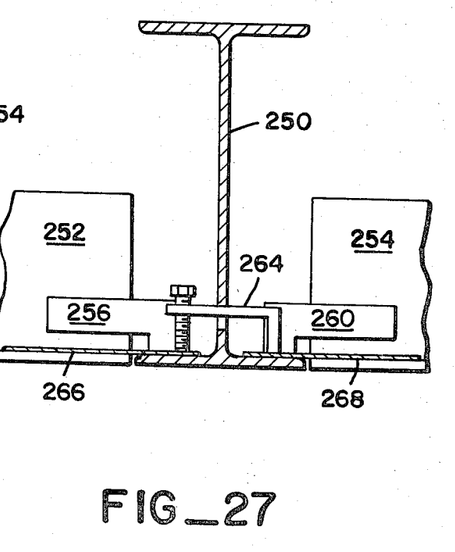
FIG. 27 is a sectional view similar to FIG. 19 showing yet another embodiment of the roof structure.
Figure 28:
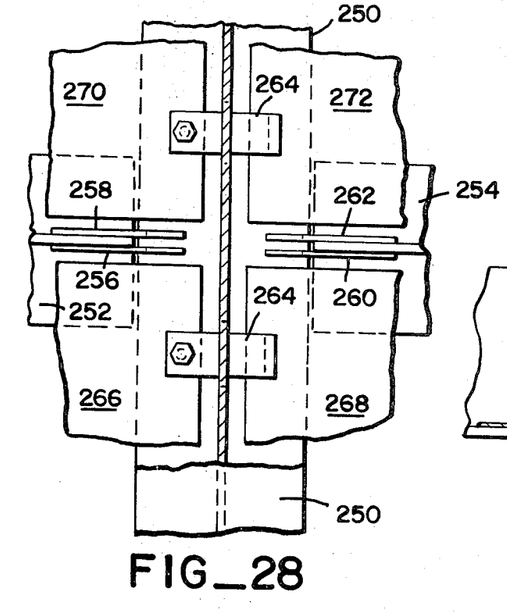
FIG. 28 is a plan view of the roof structure of FIG. 27.

FIGS. 27 and 28 show still another roof structure embodiment. This roof structure is made up of H-beams, as 250, and T-beams, as 252, 254. The ends of T-beams 252, 254 have brackets 256, 258, 260, 262 attached thereto which rest on the base portion of H-beam 250 to support the T-beams 252, 254. Dogs 264 are provided along the length of H-beams 250, and along the lengths of T-beams 252, 254 to fasten roof plates 266, 268, 270, 272, down in proper fashion. This embodiment of roof structure, it will be seen, is also tremendously strong, because of the H-beam structure utilized.

It will be seen that, in following the sequence of FIGS. 21–24, construction of the room structure at its site is quite simple, and takes relatively little time. There is, of course, no welding or nailing of member together at all, the whole construction being strictly a bolt-together one. It has been found that one of the large wall plates weighs in the order of 200 pounds, and so it can easily be handled by two men. The entire structure can be built on a slab in which case a ramp may easily be included, leading up to the top of floor framework 32 and to the doors 142, 144. The structure may be built in a pit to put the floor thereof level with the surrounding ground, in which case only a shallow pit is required. This is generally much less than the pit required in the more normal type of sandblasting room. Or, the floor framework 32 and its related structure can be completely done away with. In such an embodiment, the beams 36–58 would extend downward to a flat base plate (not shown) which rests on the ground, with bottom edges of the wall plates resting directly on the ground.

The room structure, because of its ease of construction and disassembly, can easily be moved from one site to another, if desired. The overall cost of such a room can be kept quite low, because the parts which make it up can be ordered to standard specifications. This also cuts down on errors during erection of the room it its site, because no cutting or the like of any part is required during erection. And finally, because of the use of such standard-size parts, they can be efficiently packed so that the possibility of damage thereto in shipping can be kept to a minimum, and can be easily removed and replaced.

I claim:

1. A room structure for sandblasting or the like comprising:
    (a) a room framework comprising
        (i) a floor framework having a rectangular periphery;
        (ii) a roof framework disposed above the floor framework and having a rectangular periphery;
        (iii) a plurality of upright beams extending from the periphery of the floor framework to the periphery of the roof framework in spaced relation to each other, each pair of adjacent upright beams forming with the portion of the floor framework and the portion of the roof framework running therebetween a framework opening;
    (b) a floor associated with the floor framework;
    (c) a wall comprising a plurality of wall plates, each adapted to overlap to a small extent a pair of adjacent upright beams and the floor framework and roof framework portions running therebetween to close the framework opening formed thereby, the edges of adjacent wall plates overlapping the same upright beam being spaced from each other;
    (d) a plurality of strip means, each associated with an upright beam and overlapping the edges of adjacent wall plates which overlap the same upright beam;
    (e) means fixing each strip means to its associated upright beam so that that strip means bears against the wall plate edges overlapped by that strip means; and
    (f) a roof associated with the roof framework.

2. A room structure according to claim 1 wherein are included additional strip means adapted to (i) overlap the edges of wall plates which overlap to a small extent the roof framework, and (ii) overlap the roof framework itself, and means fixing the additional strip means to the roof framework so that the additional strip means bears against the wall plate edges and roof framework overlapped by said additional strip means.

3. A room structure according to claim 2 wherein each upright beam comprises a pair of upright adjacent but spaced longitudinal beam members, and spacer means at either end of that beam to provide such spacing.

4. A room structure according to claim 3 wherein the spacer means are disposed in the space between the longitudinal beam members.

5. A room structure according to claim 4 wherein the means fixing each strip means to its associated upright beam comprise a plurality of bolts each passing through apertures in the strip means, and through and from the spacing between the beam members comprising such upright beam, and a plurality of nuts, one on each bolt.

6. A room structure according to claim 5 wherein are included clamp means at either end of each upright beam for forcing the beam members of that upright beam against the spacer means disposed in the space between the beam members.

7. A wall structure comprising:
    (a) a lower wall framework member;
    (b) an upper wall framework member disposed above the lower wall framework member;
    (c) a plurality of upright beams extending from the lower wall framework member to the upper wall framework member in spaced relation to each other, each pair of adjacent upright beams forming with the portion of the lower wall framework member and the portion of the upper wall framework member running therebetween a framework opening;
    (d) a plurality of wall plates, each adapted to overlap to a small extent a pair of adjacent upright beams and the lower and upper wall framework portions running therebetween to close the framework opening formed thereby, the edges of adjacent wall plates overlapping the same upright beam being spaced from each other;
    (e) a plurality of strip means, each associated with an upright beam and overlapping the edges of adjacent wall plates which overlap the same upright beam; and
    (f) means for fixing each strip means to its associated upright beam so that that strip means bears against the wall plate edges overlapped by the strip means.

8. A wall structure according to claim 7 wherein is included additional strip means adapted to (i) overlap the edges of wall plates which overlap to a small extent the upper wall framework member, and (ii) overlap the upper wall framework member itself, and means fixing the additional strip means to the upper wall framework member so that the additional strip means bears against the wall plate edges and upper wall framework member overlapped by said additional strip means.

9. A wall structure according to claim 8 wherein each upright beam comprises a pair of upright adjacent but spaced longitudinal beam members, and spacer means at either end of that beam for providing such spacing.

10. A wall structure according to claim 9 wherein the spacer means are disposed in the space between the longitudinal beam members.

11. A wall structure according to claim 10 wherein the means fixing each strip means to its associated upright beam comprises a plurality of bolts each passing through apertures in the strip means, and through and from the spacing between the beam members comprising such upright beam, and a plurality of nuts, one on each bolt.

12. A wall structure according to claim 11 wherein is included clamp means at either end of each upright beam for forcing the beam members of that upright beam against the spacer means disposed in the space between the beam members.

References Cited

UNITED STATES PATENTS

| | | | |
|---|---|---|---|
| 2,063,010 | 12/1936 | Balduf | 52—281 X |
| 2,237,098 | 4/1941 | Gieseking | 52—584 X |
| 2,927,665 | 3/1960 | Hauf | 52—262 |
| 3,208,410 | 9/1965 | Hayes et al. | 52—262 XR |
| 3,457,698 | 7/1969 | Albers | 52—270 XR |
| 3,470,657 | 10/1969 | Irwin | 52—79 XR |

PRICE C. FAW, JR., Primary Examiner

U.S. Cl. X.R.

52—270, 282, 463, 584